United States Patent [19]

Hood et al.

[11] Patent Number: 5,318,151
[45] Date of Patent: Jun. 7, 1994

[54] METHOD AND APPARATUS FOR REGULATING A COMPRESSOR LUBRICATION SYSTEM

[75] Inventors: James A. Hood; John E. Hart, both of Concord, N.C.

[73] Assignee: Ingersoll-Rand Company, Woodcliff Lake, N.J.

[21] Appl. No.: 32,071

[22] Filed: Mar. 17, 1993

[51] Int. Cl.$^5$ .............................................. F01M 9/00
[52] U.S. Cl. ....................... 184/6.1; 184/6.16; 184/104.1; 418/84; 418/85; 418/97; 417/292; 417/295
[58] Field of Search ............... 184/6.16, 6.22, 104.1, 184/6.1; 418/84, 85, 97; 417/292, 295

[56] References Cited

U.S. PATENT DOCUMENTS

| | | | |
|---|---|---|---|
| 2,470,655 | 5/1949 | Shaw . | |
| 3,147,912 | 9/1964 | Stelzer et al. . | |
| 3,759,348 | 9/1973 | Kasahara | 418/84 |
| 3,759,636 | 9/1973 | Schaefer et al. . | |
| 3,976,165 | 8/1976 | Pilarczyk | 184/6.22 |
| 4,054,401 | 10/1977 | Andriulis . | |
| 4,063,855 | 12/1977 | Paul . | |
| 4,289,461 | 9/1981 | van Oorschat et al. | 418/85 |
| 4,431,390 | 2/1984 | Hart . | |
| 4,526,523 | 7/1985 | Parker | 418/85 |
| 4,642,033 | 2/1987 | Boller | 417/295 |
| 5,044,167 | 9/1991 | Champagne | 184/6.16 |

FOREIGN PATENT DOCUMENTS

| | | | |
|---|---|---|---|
| 0043189 | 3/1985 | Japan | 418/85 |
| 0216093 | 8/1989 | Japan | 418/85 |

*Primary Examiner*—Thomas E. Denion
*Attorney, Agent, or Firm*—Victor M. Genco, Jr.

[57] ABSTRACT

An apparatus for regulating a compressor lubrication system includes an oil-flooded rotary gas compressor, a reservoir flow connected to the compressor, a heat exchanger for cooling a lubricant, and a controller. A thermal mixing valve regulates the temperature of the lubricant flowing to the compressor. A first temperature sensor measures a discharge temperature at a compressor outlet, and provides a signal corresponding to the discharge temperature to the controller. A second temperature sensor measures a lubricant temperature at a lubricant inlet to the compressor, and provides a signal corresponding to the lubricant temperature to the controller. A pressure sensor measures the pressure at the outlet of the compressor, and provides a corresponding pressure signal to the controller. A valve means continuously regulates the supply of lubricant to the compressor, the valve means being controlled by the controller in response to the temperature signal of the first temperature sensor and the pressure signal. Operation of the thermal mixing valve is controlled by the controller, in response to the temperature signal of the second temperature sensor, to continuously regulate the temperature of the lubricant supplied to the compressor to minimize preheating of the low pressure gas.

10 Claims, 2 Drawing Sheets

METHOD AND APPARATUS FOR REGULATING A COMPRESSOR LUBRICATION SYSTEM

BACKGROUND OF THE INVENTION

This invention generally relates to rotary compressors, and more particularly, to rotary, screw-type gas compressors which inject a lubricant into the compressor both to cool the compressor and to provide a seal within the compressor.

During rotary screw compressor operation, a pair of intermeshing lobed rotors rotate within a compression chamber. As the lobed rotors rotate, lubricant is supplied to the compression chamber to maintain a seal between the rotors and to cool the compressor. The lubricant is later expelled from the compression chamber by action of the rotors. A reservoir tank or receiver storage tank receives the compressed gas and lubricant expelled from the compression chamber.

If the compressor is being used to supply air at a desired pressure, the compressor will operate until the air pressure in the reservoir reaches a desired level. This operation is referred to as a "loaded" condition. Once the air pressure in the reservoir has reached the desired pressure level, the opening of the gas inlet to the compressor is reduced or closed so that the amount of air compressed will be reduced. This operation is referred to as an "unloaded" condition. The compressor will operate in this manner until the air pressure in the reservoir falls below the desired pressure level, at which time the gas inlet is reopened and the compressor will operate in the "loaded" condition.

Rotary screw-type compressor performance and efficiency may be maximized by performing one or more of the following actions: reducing oil supply temperature as much as possible to avoid preheating intake air; optimizing oil lubricant flow at all combinations of rotor speeds, system pressure, and load conditions; or by maintaining discharge temperature above dew point but below the maximum safe operating temperature for an oil lubricant to assure that condensation does not occur in the system.

In present compressor designs, a minimum desired discharge temperature is achieved by use of a constant temperature thermal mixing valve and a fixed supply oil restriction. Maximum discharge temperature is controlled by using a sufficiently large cooler which is able to maintain a discharge temperature less than the maximum allowable in high ambient temperatures. However, these present designs are typically ineffective in increasing compressor efficiency because these compressor designs permit higher than optimum oil supply temperatures to insure that no condensation forms in the system, and the present compressor designs permit higher than desired oil flow to insure that the compressor discharge temperature is not excessive at high ambient temperatures. However, excessive oil supply temperatures and excessive oil flow to a compressor reduces overall compressor efficiency.

The foregoing illustrates limitations known to exist in present oil-flooded rotary screw compressors. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus for regulating a compressor lubrication system having a controller and a compressor which includes an inlet for low pressure gas to be compressed, an inlet for lubricant, and an outlet through which a compressed gas and lubricant mixture is discharged. A reservoir or receiver is flow connected to the compressor outlet. The reservoir receives the compressed gas and lubricant mixture, and provides a source of lubricant to the compressor. A first temperature sensor measures a discharge temperature at the compressor outlet, and provides a signal corresponding to the discharge temperature to the controller. A valve means is flow connected to the lubricant inlet of the compressor. The controller controls the valve means, in response to the temperature signal, to continuously, selectively regulate the flow of lubricant to the compressor.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
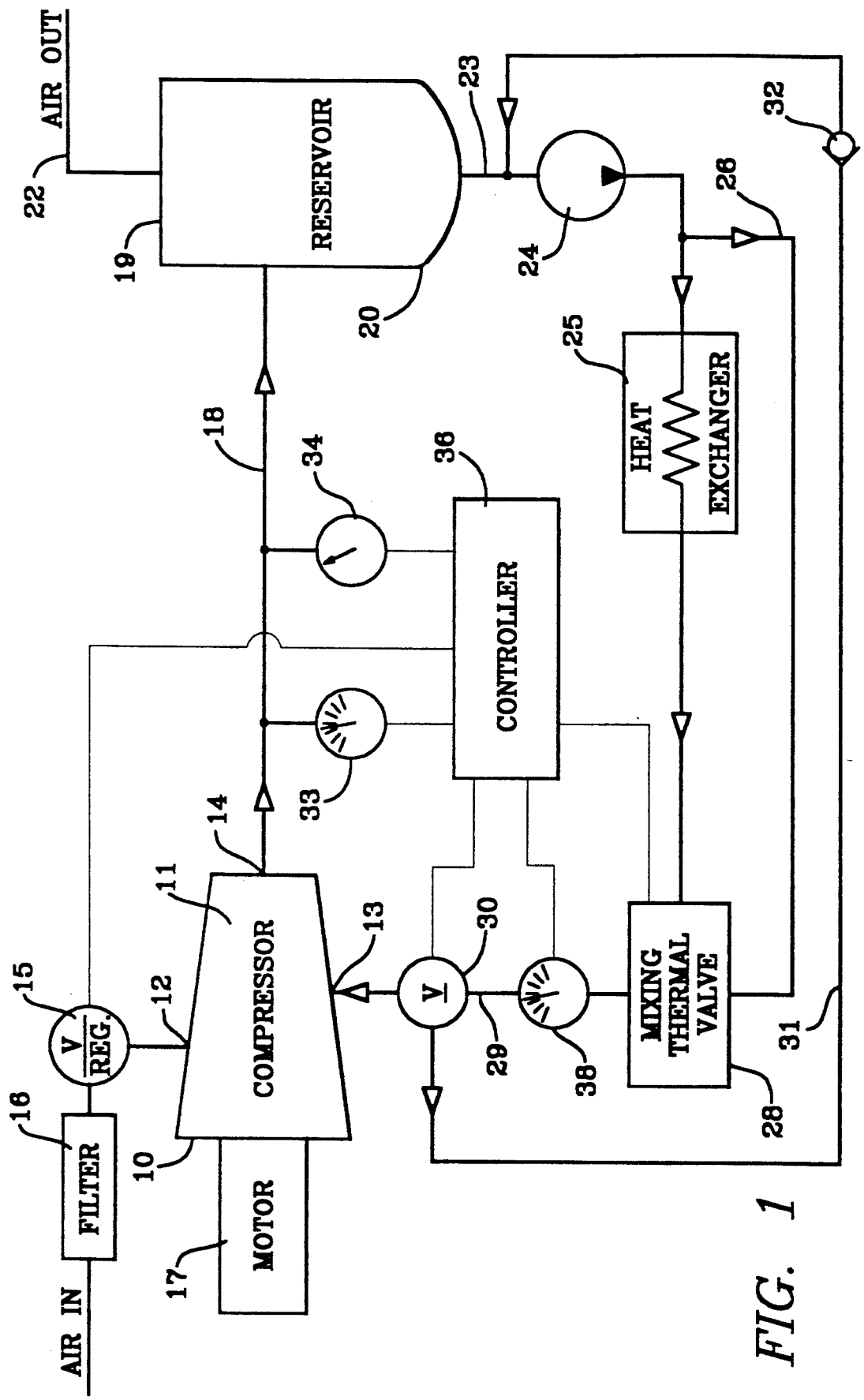
FIG. 1 illustrates a schematic representation of an apparatus which is constructed in accordance with the present invention.

Referring to FIG. 1, there is shown generally at 10, a rotary, screw-type gas compressor which includes the apparatus of the present invention. The compressor 10 uses a lubricant (not shown) to remove heat generated by the compression of a gas. The compressor 10 includes a compression chamber 11, an inlet 12 for supplying gas at low pressure to the compressor, an inlet 13 for supplying a lubricant, such as oil, to the compression chamber, and an outlet 14 through which a compressed gas and lubricant mixture is discharged from the compression chamber. An intake regulator 15 is connected to the compressor inlet 12. The gas intake regulator may be of the on/off type or the variable opening type. An inlet filter 16 may be flow connected to the intake regulator 15 so that the gas to be compressed is filtered prior to entering the compressor. The compressor 10 is suitably driven by a conventional prime mover 17, such as an electrical motor or diesel engine.

A conduit 18 is flow connected intermediate the outlet 14 and a reservoir or receiver 19 which is a typical separator type storage tank for a compressor. Typically, reservoir 19 will include a filter (not shown) for removing substantially all of the lubricant from the gas discharged from the reservoir. The removed oil collects at a bottom portion 20 of the reservoir 19 from which the oil will be supplied to the compressor 10 at a predetermined time. An outlet conduit 22 extends from the reservoir 19 to distribute the compressed gas to an object of interest.

A conduit 23 is flow connected to the bottom portion 20 of the reservoir 19. As illustrated in FIG. 1, the oil flows from the reservoir 19 through the conduit 23 to a pump 24. Pump 24 is operable to pump oil through a heat exchanger 25 or through a conduit 26 which bypasses the heat exchanger 25. The flow path of the oil through the heat exchanger 25 or through the bypass conduit 26 is governed by operation of a thermal mixing valve 28. A conduit 29 carries the oil to the lubricant inlet 13 of the compressor 10.

Figure 2:
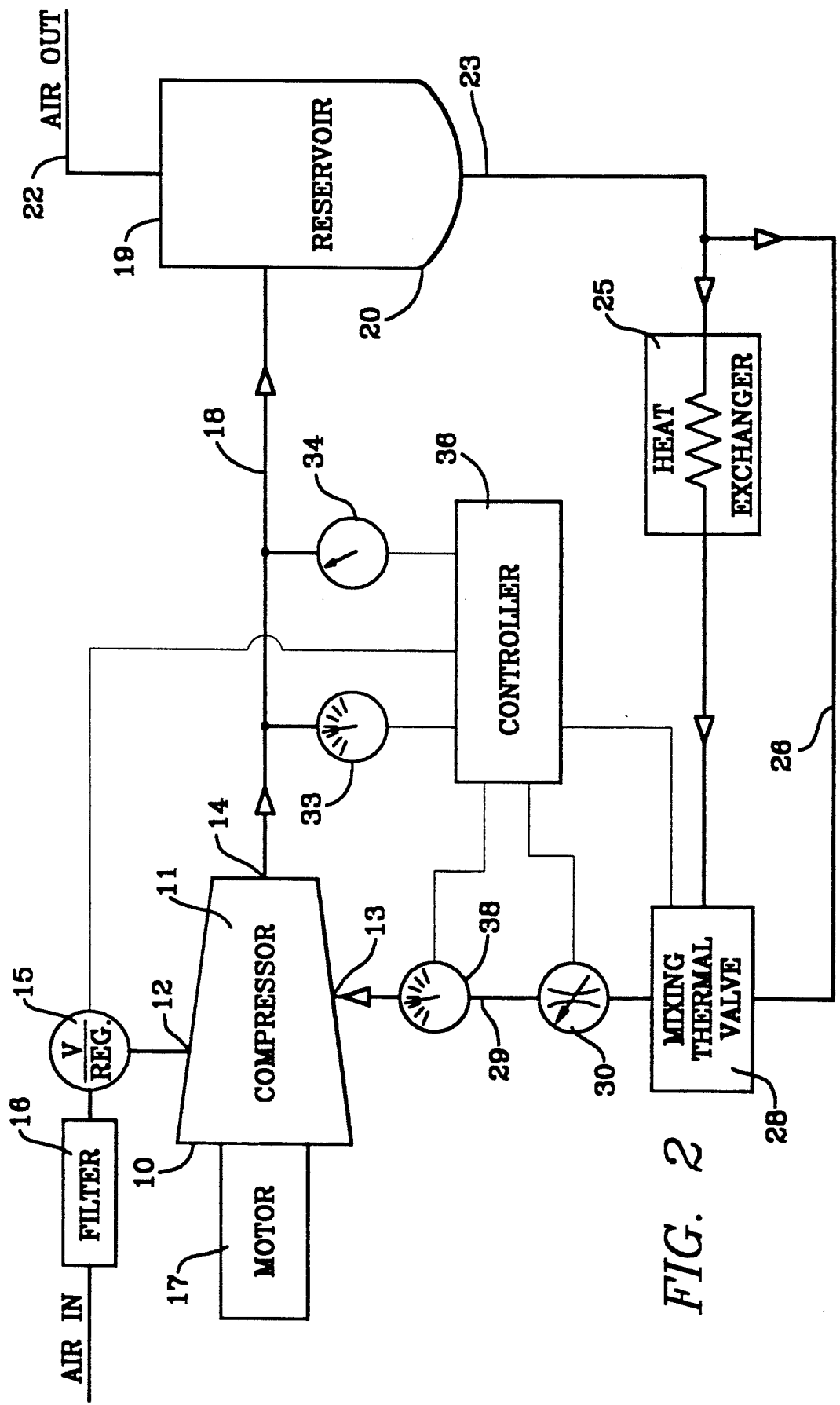
FIG. 2 illustrates an alternate embodiment of the apparatus illustrated in FIGURE 1.

A valve means or variable orifice 30 is flow connected in the conduit 29 for regulating the supply of lubricant to the inlet 13. As should be understood, although the thermal mixing valve 28 and the valve means 30 are schematically illustrated in FIGS. 1 and 2 as two discrete devices, a single, combined thermal mixing valve and valve means is within the scope of the present invention. In FIG. 1, an oil bypass conduit 31 is flow connected to the valve 30 to carry oil away from the inlet 13, at a predetermined time, to conduit 23. A one way valve 32 is disposed in the oil bypass conduit 31.

A first temperature sensor 33 and a pressure sensor 34 are both located in the conduit 18. The first temperature sensor 33 continuously measures a discharge temperature at the compressor outlet 14, and provides a first temperature signal corresponding to the discharge temperature to a controller 36. The pressure sensor 34 continuously measures the pressure at the outlet of the compressor 14, and provides a corresponding pressure signal to the controller 36. Additionally, and in the preferred embodiment, a second temperature sensor 38 continuously measures a temperature of the lubricant to be supplied to the compressor 10, and provides a second temperature signal corresponding to the lubricant temperature to the controller 36. However, the apparatus of the present invention may include a conventional thermal mixing valve which would control the temperature of the lubricant flowing to the compressor 10 independently of the controller 36.

The controller 36 is disposed in signal receiving relation to the first temperature sensor 33, the pressure sensor 34, and the second temperature sensor 38. Further, the controller 36 is disposed in signal transmitting relation to the intake regulator 15, the thermal mixing valve 28, and the valve means 30, to control same in response to the signals of the sensors 33, 34, and 38. In the preferred embodiment, the controller is a microprocessor.

In operation, oil supply to the compressor 10 is optimized by action of the controller 36 which continuously controls oil supply by controlling operation of the valve means 30 in response to the first temperature signal and the pressure signal. In this regard, and as illustrated in FIG. 1, oil supply to the inlet 13 is controlled in a lubrication system having a pump 24 by bypassing oil from the inlet 13, by action of the valve means 30, through the oil bypass conduit 31 to the conduit 23. However, in a pump-less system, and as illustrated in FIG. 2, oil supply to the compressor 10 is controlled by throttling the oil supply to the inlet 13 by action of the valve means or variable orifice 30. Additionally, and in the preferred embodiment, the temperature of the lubricant flowing to the compressor inlet 13 is minimized by action of the controller 36 which continuously regulates the thermal mixing valve 28 in response to the temperature signal provided by the second temperature sensor 38. Finally, the controller 36 is operable to maintain compressor discharge temperature in a predetermined range above a dew point temperature of the compressed gas and below a predetermined safe operating temperature the lubricant.

As should be understood, the efficiency of the compressor 10 is a function of the oil flow rate and the oil supply temperature at the inlet 13. The present invention optimizes compressor performance under all operating conditions, e.g. loaded, unloaded, and variable operating conditions, such as varying ambient temperatures. Additionally, the present invention provides an apparatus for continuously monitoring compressor system conditions, including system temperature and system pressure, to determine necessary adjustments to oil flow and oil supply temperature to optimize compressor performance on a continuous basis. For example, when the temperature leaving the compressor exceeds a predetermined amount, i.e. above 220° F., the controller 36 acts upon the signal from first temperature sensor 33 to increase the amount of lubricant passing through the compression chamber 11. Conversely, when the temperature of the lubricant leaving the compression chamber is too low, e.g., below 160°, condensation may occur in the system, and the flow of lubricant is lessened which raises the temperature in the compression chamber.

While this invention has been illustrated and described in accordance with a preferred embodiment, it is recognized that variations and changes may be made therein without departing from the invention as set forth in the following claims.

Having described the invention, what is claimed is:

1. An apparatus for regulating a gas compressor lubrication system, the apparatus comprising:
   a compressor having an inlet for low pressure gas to be compressed, an inlet for lubricant, and an outlet through which a compressed gas and lubricant mixture is discharged;
   means for providing a source of lubricant to the lubricant inlet of the compressor;
   a first temperature sensor which measures a compressor discharge temperature, and which provides a signal corresponding thereto;
   a pressure sensor which measures a compressor discharge pressure, and which provides a signal corresponding thereto;
   valve means for regulating the flow of lubricant to the lubricant inlet of the compressor; and
   a controller disposed in communication with the first temperature sensor and the pressure sensor, the controller continuously controlling the valve means in response to the temperature signal and the pressure signal thereby regulating the flow of lubricant to the lubricant inlet of the compressor to optimize compressor performance, and the controller, in response to the pressure signal, controlling the flow of low pressure gas to the compressor.

2. An apparatus as claimed in claim 1, the apparatus further including a second temperature sensor which measures a lubricant temperature at the lubricant inlet of the compressor, and which provides a signal corresponding thereto to the controller, the controller continuously regulating the temperature of the lubricant flowing to the lubricant inlet in response to the second temperature signal.

3. An apparatus as claimed in claim 2, the apparatus further including a heat exchanger and a thermal mixing valve which is disposed in signal receiving relation to the controller, and in response to the temperature signal provided by the second temperature sensor to the controller, the controller controls the operation of the thermal mixing valve to thereby continuously regulate the temperature of the lubricant supplied to the compressor by controlling the amount of lubricant flowing through the heat exchanger, and regulation of the temperature of the lubricant minimized pre-heating the low pressure gas.

4. An apparatus as claimed in claim 1, and wherein the compressor is a rotary screw-type compressor.

5. An apparatus as claimed in claim 1, and wherein the controller is a microprocessor.

6. A lubrication regulation system for use in combination with a compressed fluid system which includes a compressor, a receiver, and a heat exchanger which cools the lubricant, the compressor having an inlet for low pressure gas to be compressed, an inlet for lubricant, and an outlet through which a compressed gas and lubricant mixture are discharged, the lubrication regulation system comprising:
   a controller;
   a first temperature sensor which measures a discharge temperature at the compressor outlet, and which provides a signal corresponding thereto to the controller;
   a pressure sensor which measures the pressure at the outlet of the compressor, and which provides a signal corresponding thereto to the controller, and wherein in response to the pressure signal, the controller regulates the flow of low pressure gas to the compressor;
   valve means for regulating the flow of lubricant to the compressor, the controller continuously controlling the valve means in response to the first temperature signal and the pressure signal to continously, selectively regulate the supply of lubricant to the compressor.

7. An lubrication system as claimed in claim 6, the lubrication system further including a second temperature sensor which measures a lubricant temperature at the lubricant inlet of the compressor, and which provides a signal corresponding to the lubricant temperature to the controller.

8. An apparatus as claimed in claim 7, the apparatus further including a heat exchanger and a thermal mixing valve which is disposed in signal receiving relation to the controller, and in response to the temperature signal provided by the second temperature sensor to the controller, the controller controls the operation of the thermal mixing valve to the thereby continously regulate the temperature of the lubricant supplied to the compressor by controlling the amount of lubricant flowing through the heat exchanger, and regulation of the temperature of the lubricant minimizes pre-heating the low pressure gas.

9. A method of regulating a lubrication system of an oil flooded compressor apparatus, the compressor apparatus including a compressor, a receiver, and a heat exchanger which cools the lubricant, the compressor having an inlet for low pressure gas to be compressed, an inlet for lubricant, and an outlet through which a compressed gas and lubricant mixture are discharged, the method of regulating the lubrication system comprising:
   compressing a gas in the compressor;
   supplying a lubricant to the compressor to remove heat generated by the compression of the gas;
   continously measuring a compressor discharge temperature at the compressor outlet;
   generating a first signal corresponding to the discharge temperature;
   continously measuring a pressure at the outlet of the compressor;
   generating a second signal corresponding to the compressor outlet pressure;
   continously measuring a temperature of the lubricant to be supplied to the compressor;
   generating a third signal corresponding to the supply lubricant temperature;
   inputting the first, second and third signals to a controller;
   in response to the first signal and the second signal, continuously controlling the supply of lubricant to the compressor; and
   in response to the third signal, continuously controlling the temperature of the lubricant supplied to the compressor, by controlling the amount of lubricant flowing through the heat exchanger.

10. A lubricant regulation system for supplying lubricant to a gas compressor which includes a compression chamber, an inlet for gas at low pressure to be compressed, an inlet for the lubricant, an outlet for compressed gas at higher pressure and lubricant, a reservoir flow connected to the outlet for the compressed gas and lubricant for providing a source of lubricant to said compression chamber, and a valve means for regulating the amount of lubricant to said lubricant inlet, the lubricant regulation system comprising:
   a temperature sensor for producing a temperature signal of the lubricant leaving the gas compression chamber,
   a pressure sensor for measuring the pressure of the compressed gas leaving the compression chamber and for providing a signal corresponding thereto, and
   control means for controlling the operation of the compressor in response to the temperature signal and the pressure signal to selectively control the amount of lubricant and the amount of low pressure gas entering the compressor.

* * * * *